(12) United States Patent  
Ghosh

(10) Patent No.: US 6,459,574 B1
(45) Date of Patent: Oct. 1, 2002

(54) DOCKING STATION HAVING A COOLING UNIT TO COOL AN ELECTRONIC DEVICE

(75) Inventor: Prosenjit Ghosh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/752,257

(22) Filed: Dec. 28, 2000

(51) Int. Cl.[7] .................................................. G06F 1/16
(52) U.S. Cl. ........................ 361/687; 361/699; 361/707; 165/80.4; 174/15.2
(58) Field of Search ................................. 361/686, 687, 361/699, 700, 704, 707; 364/708.1; 165/80.4, 104.33, 104.21; 62/259.2; 174/15.2

(56) References Cited

U.S. PATENT DOCUMENTS

| 5,870,283 A | * | 2/1999 | Maeda et al. ................ 361/686 |
| 6,021,045 A | * | 2/2000 | Johnson ....................... 361/704 |
| 6,275,945 B1 | * | 8/2001 | Tsuji et al. .................. 713/300 |

* cited by examiner

*Primary Examiner*—Darren Schuberg
*Assistant Examiner*—Hung Van Duong
(74) *Attorney, Agent, or Firm*—Blakely, Sokoloff, Taylor & Zafman LLP

(57) ABSTRACT

A docking station is provided with apertures that line up with apertures: in an electronic device. When the electronic device is docked on the docking station, cooler air is forced into the electronic device through the openings of the docking station and the electronic device.

14 Claims, 3 Drawing Sheets

DOCKING STATION HAVING A COOLING UNIT TO COOL AN ELECTRONIC DEVICE

BACKGROUND OF THE INVENTION

Intel® SpeedStep™ Technology or other similar variable power technologies makes it possible for the processor in a docked electronic device to run at a higher frequency than when in undocked battery mode. A faster processor generates more heat and typically requires more cooling. Current practice is to design internal electronic device cooling based on maximum performance heat dissipation requirements. However, market studies indicate electronic devices are infrequently used in the high performance mode. As a result, the entire cooling solution—fans, heat sinks, etc.—are typically larger, heavier, and more expensive than warranted by typical usage models. Based on the current design paradigm, the continued escalation of system performance and power—aimed at high performance usage scenarios—will require larger onboard cooling solutions occupying a higher percentage of a finite electronic device volume. A prior art electronic device and docking station is illustrated in FIG. 1.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A method and apparatus for providing a electronic device and docking station configuration wherein the docking station forces cooler air into the internal chambers of the electronic device, is disclosed. In the following description, for purposes of explanation, specific details are set forth to provide a thorough understanding of the present invention. However, it will be apparent to one skilled in the art that these specific details are not required in order to practice the present invention.

Figure 1:
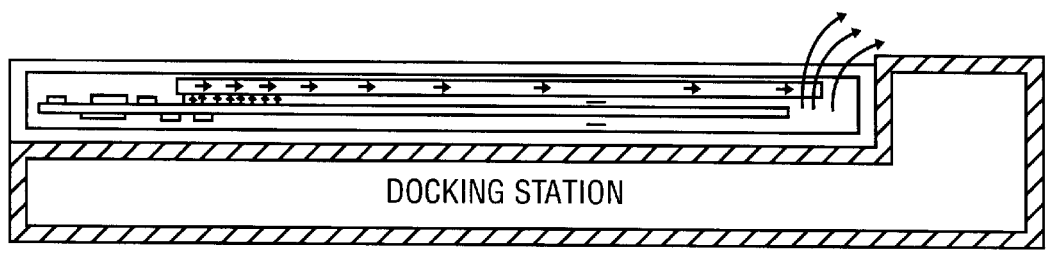
FIG. 1 illustrates a prior art docking station and electronic device.
Figure 2:
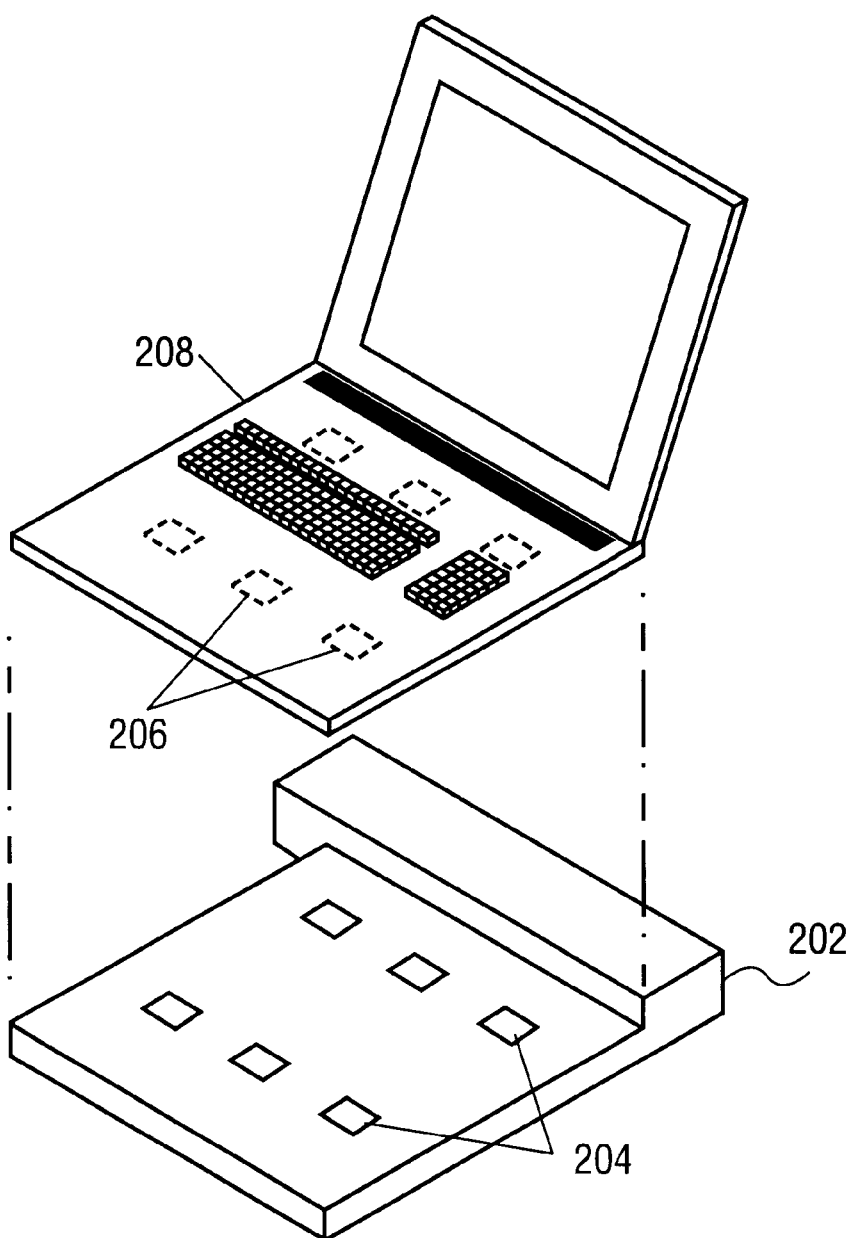
FIG. 2 illustrates an isometric view of the docking station and electronic device according to one embodiment.

In one embodiment, as illustrated in FIG. 2, a docking station 202 is provided with openings/apertures 204 that line up with openings/apertures 206 in the electronic device electronic device 208. In the embodiment illustrated in FIG. 2, the electronic device is shown as a computer. In alternative embodiments, the alternative electronic devices could be used in place of the computer, such as audio and/or video equipment. When the electronic device 208 is docked on the docking station 202, cooler air is forced into the electronic device 208 through the openings 206 of the docking station 202 and the electronic device.

As further illustrated in FIG. 2, the apertures of the electronic device are located on the bottom of the electronic device to align with apertures on the surface of the docking station. In alternative embodiment, the apertures of the electronic device and docking station may be provided in different and/or separate locations.

For example, the apertures may be provided on the sides of the electronic device to align with apertures provided on the internal sides of the docking station. Furthermore, the number of apertures provided and the size of the apertures may vary without departing from the scope of the invention.

In one embodiment, the apertures on the electronic device include sliding doors that remain closed when the electronic device is undocked and are slid open when the electronic device is docked. As a result, foreign objects are restricted from invading the internal chamber of then electronic device when the electronic device is undocked.

For example, in one embodiment, the doors to the apertures of the electronic device are spring biased to have the doors remain closed when the electronic device is undocked. The docking station is provided with protruding integral knobs that stand out to catch a latch on the door to the apertures of the electronic device and push the door to the aperture open as the electronic device is slid into the docking station. When the electronic device is removed, the spring-biased doors will close.

The example described above is one example of providing doors to the apertures of the electronic devices. A similar configuration for providing sliding doors on the electronic device may also be provided. Moreover, alternative configurations for opening and closing doors to the apertures of the electronic device could be implemented without departing from the scope of the invention. In some instances, the opening may be permanent openings that match openings on the dock.

Figure 3:
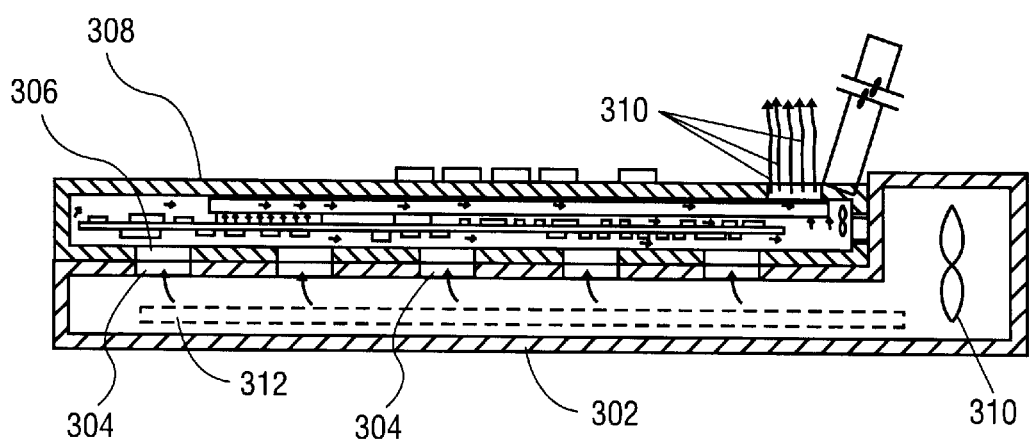
FIG. 3 illustrates a cut-a-way side view of the docking station and electronic device according to one embodiment.

As illustrated in FIG. 3, the docking station 302 includes a unit 310 (e.g., a fan) to force air into the electronic device via the apertures of the docking station and electronic device. The unit 310 in the docking station to force air into the electronic device positively pressurizes the internal chamber of the electronic device by forcing air into the electronic device with an air pressure higher than air is released by the electronic device.

The electronic device includes vents 310 that decrease the release of air from the internal chamber of the computer electronic device to assist in creating positively pressurizing the internal chamber of the electronic device. In alternative embodiments, other types of units to force air into the electronic device (and positively pressurize the internal chamber of the electronic device) may be used without departing from the scope of the invention.

In one embodiment, also illustrated in FIG. 3, the docking station may also include a unit 312 to generate sub-ambient temperature air to be forced into the electronic device (wherein the air forced into the electronic device is of a lower temperature than the ambient air within the internal chamber of the electronic device).

In one embodiment, when the electronic device is docked into the docking station, a thermometer from the docking station (not shown) may extend up into the internal chamber of the electronic device via the aligned apertures. The thermometer from the docking station may measure the internal ambient temperature within the electronic device to have the unit 312 within the docking station generate sub-ambient temperature air adjust accordingly (e.g., if the ambient air within the electronic device is warmer, cooler air would be generated).

In alternative embodiment, alternative techniques for determining the ambient air temperature either within the electronic device or external to the electronic device and adjusting the temperature of the air forced into the electronic device may be implanted without departing from the scope of the invention.

In the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. An apparatus comprising:

a first aperture to dock an electronic device;

at least a second aperture to align with an aperture of the electronic device, when the electronic device is docked; and a unit to force air through the second aperture into the electronic device when the electronic device is docked, the unit to force air through the second aperture forces air into the electronic device at a pressure greater than air is released from the electronic device.

2. The apparatus of claim 1, wherein the apparatus includes a cooling unit to generate air to forced into the electronic device that is of a lower temperature compared to an ambient air temperature within said electronic device.

3. The apparatus of claim 1, wherein the apparatus includes a unit to open a door to the aperture of the electronic device when the electronic device is docked.

4. The apparatus of claim 1, wherein the apparatus includes a set of apertures to align with a set of apertures of the electronic device, when the electronic device is docked.

5. The apparatus of claim 4, wherein the apparatus includes a fan to force air into the electronic device when the electronic device is docked.

6. An electronic device comprising:

a first aperture to align with an aperture of a docking station when the electronic device is docked; and a vent to release air from within the electronic device at a pressure lower than a pressure at which air is forced into the electronic device via the first aperture aligned with the aperture of the docking station.

7. The electronic device of claim 6, wherein the electronic device includes a set of apertures to align with a set of apertures of the docking station when the electronic device is docked.

8. The electronic device of claim 7, wherein the set of apertures of the electronic device includes doors that are closed when the electronic device is undocked.

9. The electronic device of claim 7, wherein the set of apertures of the electronic device are to receive air forced into the electronic device via the apertures of the docking station, wherein the air forced into the electronic device has a lower temperature compared to an ambient air temperature within the electronic device.

10. The electronic device of claim 8, wherein the doors of the set of apertures of the electronic device are opened when the electronic device is docked.

11. A method of cooling an electronic device comprising:

docking of the electronic device;

aligning a set of apertures of a docking station with a set of apertures of the electronic device; and forcing air into the electronic device from the docking station at a pressure greater than air is released from the electronic device.

12. The method of claim 11, further including providing air to the computer station from the docking station at a temperature lower than an ambient temperature within the electronic device.

13. The method of claim 12, further including opening doors of the apertures of the electronic device when the electronic device is docked.

14. The method of claim 13, further including closing the doors of the apertures of the electronic device when the electronic device is undocked.

* * * * *

UNITED STATES PATENT AND TRADEMARK OFFICE
CERTIFICATE OF CORRECTION

PATENT NO. : 6,459,574 B1  
DATED : October 1, 2002  
INVENTOR(S) : Ghosh

It is certified that error appears in the above-identified patent and that said Letters Patent is hereby corrected as shown below:

<u>Title page,</u>  
Item [57], ABSTRACT,  
Line 2 after "apertures", delete ":".

Signed and Sealed this

Twenty-second Day of June, 2004

JON W. DUDAS  
*Acting Director of the United States Patent and Trademark Office*